(12) United States Patent
Hattori

(10) Patent No.: US 8,860,244 B2
(45) Date of Patent: Oct. 14, 2014

(54) VEHICLE POWER SUPPLY APPARATUS

(75) Inventor: Hisao Hattori, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 699 days.

(21) Appl. No.: 13/059,155

(22) PCT Filed: Aug. 27, 2009

(86) PCT No.: PCT/JP2009/004156
§ 371 (c)(1),
(2), (4) Date: Feb. 15, 2011

(87) PCT Pub. No.: WO2010/026715
PCT Pub. Date: Mar. 11, 2010

(65) Prior Publication Data
US 2011/0140518 A1      Jun. 16, 2011

(30) Foreign Application Priority Data

Sep. 8, 2008  (JP) ................................. 2008-229806
Dec. 2, 2008  (JP) ................................. 2008-307678

(51) Int. Cl.
*B60L 1/00*      (2006.01)
*H02J 7/14*      (2006.01)
*H02J 7/34*      (2006.01)

(52) U.S. Cl.
CPC ............... *H02J 7/1423* (2013.01); *H02J 7/345* (2013.01); *H02J 7/1438* (2013.01); *Y02T 10/7022* (2013.01); *Y02T 10/7005* (2013.01)
USPC .......................................................... 307/9.1

(58) Field of Classification Search
USPC ......... 307/9.1, 10.1, 112, 113, 116, 125, 130, 307/141
See application file for complete search history.

(56) References Cited

U.S. PATENT DOCUMENTS 5,563,479 A * 10/1996 Suzuki ........................ 318/139
6,618,666 B2 * 9/2003 Amano et al. ................ 701/113

(Continued)

FOREIGN PATENT DOCUMENTS

DE    10 2004 016 292 A1    10/2005
DE    10 2004 038 527 A1    3/2006

(Continued)

OTHER PUBLICATIONS

International Search Report in International Application No. PCT/JP2009/004156; dated Oct. 13, 2009 (with English-language translation).

(Continued)

*Primary Examiner* — Rexford Barnie
*Assistant Examiner* — Daniel Kessie
(74) *Attorney, Agent, or Firm* — Oliff PLC

(57) ABSTRACT

There is provided a vehicle power supply apparatus which includes a battery charged by a generator and supplies, to a plurality of loads, electric power discharged by the battery and electric power generated by the generator. The apparatus includes an electric double layer capacitor connected in parallel to the battery, and a connection circuit for switching connection and disconnection between respective homopolar terminals of the battery and the electric double layer capacitor. The connection circuit is connected to charge the electric double layer capacitor based on a potential difference between terminals of the connection circuit. The plurality of loads include loads each of which generates a rush current of a predetermined value or more and each of which is fed electric power outputted by the electric double layer capacitor.

8 Claims, 14 Drawing Sheets

(56) References Cited

U.S. PATENT DOCUMENTS

| | | | |
|---|---|---|---|
| 6,624,640 B2 * | 9/2003 | Lund et al. | 324/678 |
| 7,224,591 B2 * | 5/2007 | Kaishita et al. | 363/60 |

FOREIGN PATENT DOCUMENTS

| | | | | |
|---|---|---|---|---|
| EP | 2 080 673 A1 | | 7/2009 | |
| JP | 05116571 A | * | 5/1993 | ............. B60R 16/04 |
| JP | A-05-116571 | | 5/1993 | |
| JP | 09275635 A | * | 10/1997 | ............... H02J 1/00 |
| JP | A-09-275635 | | 10/1997 | |
| JP | A-10-095290 | | 4/1998 | |
| JP | A-11-41787 | | 2/1999 | |
| JP | A 2002-266730 | | 9/2002 | |
| JP | A-2004-282822 | | 10/2004 | |
| JP | A-2005-028908 | | 2/2005 | |
| JP | A-2005-145278 | | 6/2005 | |
| JP | A 2006-29142 | | 2/2006 | |
| JP | A-2007-205496 | | 8/2007 | |
| JP | A-2007-228691 | | 9/2007 | |
| JP | A-2007-253879 | | 10/2007 | |
| JP | 2008114678 A | * | 5/2008 | |
| JP | A-2008-114678 | | 5/2008 | |
| JP | A-2008-141854 | | 6/2008 | |
| WO | WO 2008/053808 A1 | | 5/2008 | |

OTHER PUBLICATIONS

Oct. 16, 2012 Office Action issued in Japanese Patent Application No. 2010-527670 (with translation).

International Preliminary Report on Patentability in International Application No. PCT/JP2009/004156; dated Apr. 12, 2011.

Jan. 14, 2014 Office Action issued in Japanese Patent Application No. 2012-271321 (w/ English Translation).

May 28, 2014 Office Action issued in German Patent Application No. 11 2009 002 169.7 (w/ English Translation).

* cited by examiner

F I G. 2D
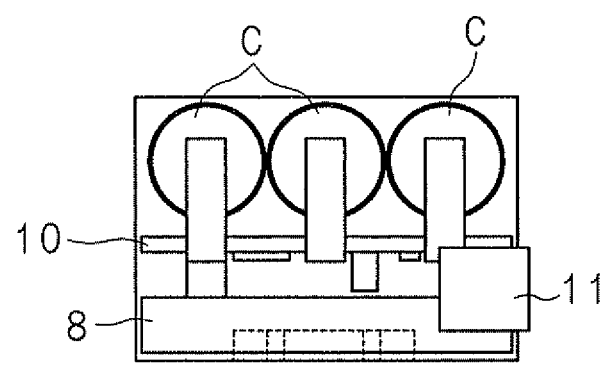

VEHICLE POWER SUPPLY APPARATUS

This application is the national phase under 35 U.S.C. §371 of PCT International, Application No. PCT/JP2009/004156 which has an International filing date of Aug. 27, 2009 and designated the United States of America.

1. Technical Field

The present invention relates to a vehicle power supply apparatus which includes a battery charged with electric power generated by a generator operated in conjunction with an engine and through which electric power discharged by the battery and electric power generated by the generator are supplied to a plurality of loads.

2. Description of Related Art

A vehicle power supply apparatus is configured to supply, to each load mounted on a vehicle, electric power generated by a generator operated in conjunction with an engine, to charge a battery, and to supply electric power from the battery to each load when the electric power generated by the generator is insufficient or when the engine is stopped.

Recently, an electric double layer capacitor, having a very high capacitance such as several tens of Farads or more and exhibiting excellent charge and discharge cycle characteristic (lifetime) and rapid charge and discharge ability, has been widely available and has been proposed, for example, as a backup for a battery also in a vehicle power supply apparatus.

Japanese Patent Application Laid-Open No. 2007-253879 discloses an engine automobile electrical system configured so that a discharge current from a battery and a discharge current from an electric double layer capacitor flow into a starter by an operation performed on an engine start switch. The electric double layer capacitor is located closer to the starter than the battery, and a wire harness through which the discharge current from the battery flows is connected to an electric supply line through which the discharge current fed from the electric double layer capacitor to the starter flows. The wire harness is selected so that the discharge current from the battery becomes lower than the discharge current from the electric double layer capacitor when the starter is activated.

SUMMARY

A vehicle power supply apparatus has a problem that when a load such as a motor is started up, an excessive rush current is generated instantaneously, a power supply voltage is temporarily dropped due to an internal resistance of a battery, and some loads such as an ECU (Electronic Control Unit) and the like might not function properly.

Further, in the electrical system disclosed in Japanese Patent Application Laid-Open No. 2007-253879, a drop in supply power voltage, caused by a rush current generated at the starter, is reduced by increasing electric power fed from the electric double layer capacitor having a low internal resistance; however, there is a problem that when an abnormality has occurred in the battery and the power supply voltage is dropped, an output voltage from the electric double layer capacitor is also dropped.

The present invention has been made in view of the above-described circumstances, and its object is to provide a vehicle power supply apparatus which includes an electric double layer capacitor and in which it is difficult for the electric double layer capacitor and a battery to exert an influence on each other, so that even when a rush current is generated, the possibility of improper functioning of a load due to a drop in power supply voltage is prevented.

A first aspect in accordance with the present invention provides a vehicle power supply apparatus which includes a battery charged with electric power generated by a generator operated in conjunction with an engine and through which electric power discharged by the battery and electric power generated by the generator are supplied to a plurality of loads, wherein the apparatus includes: an electric double layer capacitor connected in parallel to the battery; a connection circuit for switching connection and disconnection between respective homopolar terminals of the battery and the electric double layer capacitor; and potential difference detecting means for detecting a potential difference between terminals of the connection circuit, wherein the connection circuit is connected to charge the electric double layer capacitor based on the potential difference detected by the potential difference detecting means, and wherein the loads include loads each of which generates a rush current of a predetermined value or more and each of which is fed electric power outputted by the electric double layer capacitor.

In this vehicle power supply apparatus, the battery is charged with the electric power generated by the generator operated in conjunction with the engine, and the electric power discharged by the battery and the electric power generated by the generator are supplied to the plurality of loads. The electric double layer capacitor is connected in parallel to the battery, and the circuit for switching connection and disconnection switches connection and disconnection between the respective homopolar terminals of the battery and the electric double layer capacitor. The detecting means detects a potential difference between the terminals of the circuit for switching connection and disconnection. The circuit for switching connection and disconnection is connected to charge the electric double layer capacitor based on the detected potential difference. Furthermore, the plurality of loads include loads each of which generates a rush current of a predetermined value or more and each of which is fed electric power outputted by the electric double layer capacitor.

A second aspect in accordance with the present invention provides a vehicle power supply apparatus, wherein electric power is also directly supplied from the battery to some of the loads each of which generates the rush current.

A third aspect in accordance with the present invention provides a vehicle power supply apparatus, wherein the loads, each of which generates the rush current, include a starter of the engine.

A fourth aspect in accordance with the present invention provides a vehicle power supply apparatus, wherein the apparatus further includes a switch for switching connection and disconnection between the starter and the battery, and wherein the switch is connected only when the starter is activated.

A fifth aspect in accordance with the present invention provides a vehicle power supply apparatus which includes a battery charged with electric power generated by a generator operated in conjunction with an engine and through which electric power discharged by the battery and electric power generated by the generator are supplied to a plurality of loads, wherein the apparatus includes: an electric double layer capacitor connected to the battery through a backflow prevention circuit so as to be charged; a second switch for switching connection and disconnection between the electric double layer capacitor and one or a plurality of the loads; voltage detecting means for detecting an output voltage from the battery; and means for determining whether or not the voltage detected by the voltage detecting means is lower than a predetermined voltage, and wherein upon determination by the means that the detected voltage is lower than the predetermined voltage, the second switch is connected.

In this vehicle power supply apparatus, the battery is charged with the electric power generated by the generator operated in conjunction with the engine, and the electric power discharged by the battery and the electric power generated by the generator are supplied to the plurality of loads. The electric double layer capacitor is connected to the battery through the backflow prevention circuit so as to be charged, and the second switch switches connection and disconnection between the electric double layer capacitor and one or a plurality of the loads. The voltage detecting means detects the output voltage from the battery, and the determining means determines whether or not the detected voltage is lower than the predetermined voltage. Upon determination by the determining means that the detected voltage is lower than the predetermined voltage, the second switch is connected.

A sixth aspect in accordance with the present invention provides a vehicle power supply apparatus, wherein the apparatus further includes: time measuring means for measuring a time elapsed since start of the engine; second voltage detecting means for detecting an output voltage from the electric double layer capacitor; determining means for determining whether or not the output voltage detected by the second voltage detecting means falls within a predetermined voltage range; and indicator means for indicating a determination result upon determination by the determining means that the detected output voltage falls within the predetermined voltage range after measurement of a predetermined time by the time measuring means.

In this vehicle power supply apparatus, the time measuring means measures the time elapsed since the start of the engine, and the second voltage detecting means detects the output voltage from the electric double layer capacitor. The determining means determines whether or not the output voltage detected by the second voltage detecting means falls within the predetermined voltage range. The indicator means indicates the determination result upon determination by the determining means that the detected output voltage falls within the predetermined voltage range after the measurement of the predetermined time by the time measuring means.

A seventh aspect in accordance with the present invention provides a vehicle power supply apparatus, wherein the second switch is operated in conjunction with the indicator means.

An eighth aspect in accordance with the present invention provides a vehicle power supply apparatus, wherein the electric double layer capacitor is contained in an electric connection box in which a branch circuit from the battery to the load and a fuse are contained.

The present invention is capable of implementing a vehicle is power supply apparatus which includes an electric double layer capacitor and in which it is difficult for the electric double layer capacitor and a battery to exert an influence on each other, so that even when a rush current is generated, the possibility of improper functioning of a load due to a drop in power supply voltage is prevented.

The above and further objects and features will more fully be apparent from the following detailed description with accompanying drawings.

BRIEF DESCRIPTION OF THE DRAWINGS

FIG. 2D is an explanatory diagram illustrating a cross section as viewed from a lower face of the state in which the electric double layer capacitor is contained in the junction box of the vehicle power supply apparatus according to the present invention.

DETAILED DESCRIPTION

Hereinafter, the present invention will be described based on the drawings illustrating embodiments thereof.
(Embodiment 1)

Figure 1:
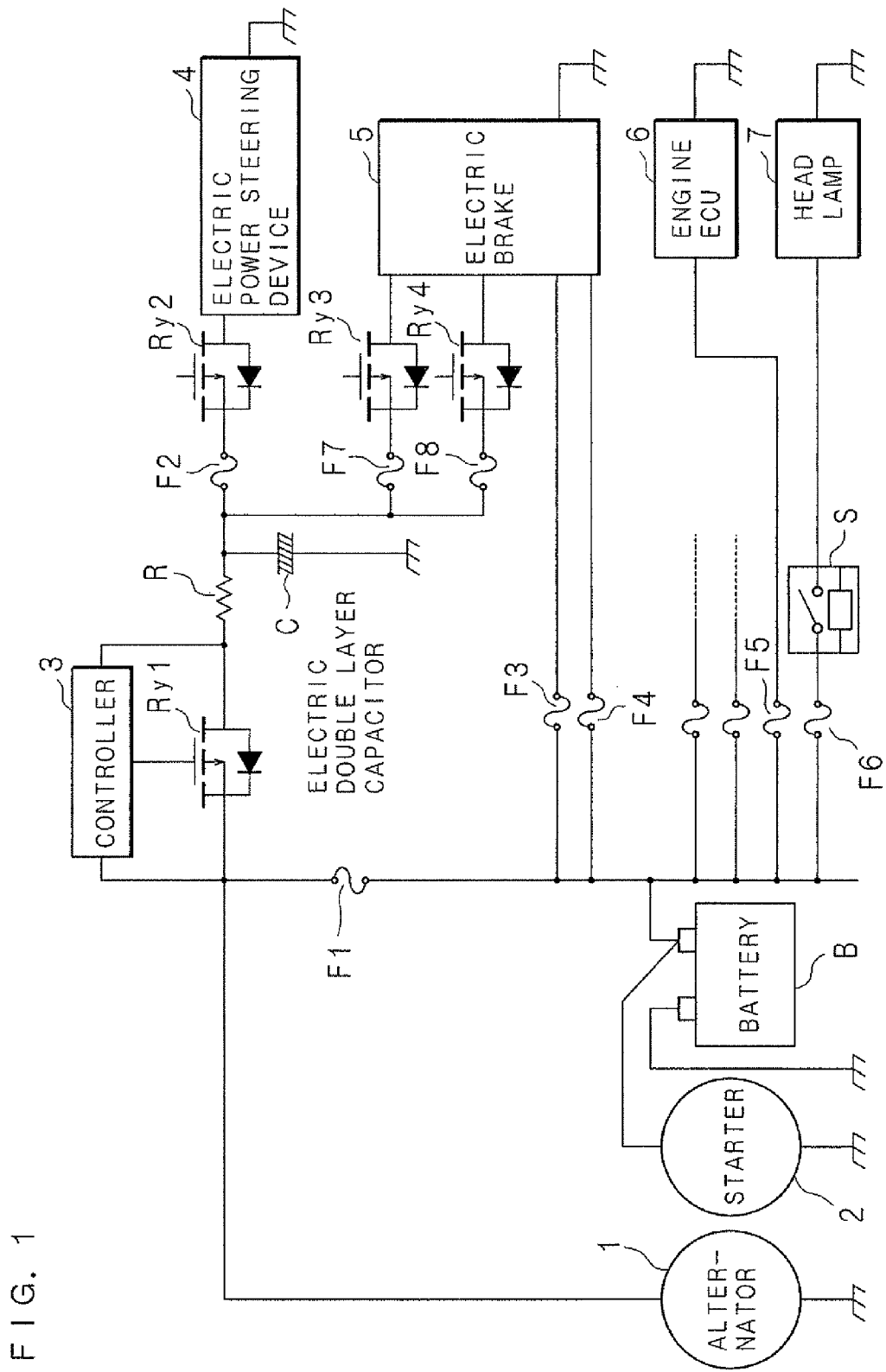
FIG. 1 is a block diagram illustrating a schematic configuration of an embodiment of a vehicle power supply apparatus according to the present invention.

FIG. 1 is a block diagram illustrating a schematic configuration of Embodiment 1 of a vehicle power supply apparatus according to the present invention.

In this vehicle power supply apparatus, an alternator (vehicle-mounted generator or alternating current generator) 1 generates electric power by operating in conjunction with an unillustrated engine. Electric power generated by the alternator 1 is rectified in the alternator 1, and then a battery B is charged with the electric power through a fuse F1.

An output voltage from the battery B is supplied to, for example, an engine ECU (load) 6 through a fuse F5, and is supplied to a head lamp (load) 7 through a fuse F6 and a switch S. Moreover, the output voltage is supplied to an electric brake 5 through each of fuses F3 and F4 (for a front wheel and a rear wheel). The output voltage from the battery B is further supplied to a starter (load) 2 of the engine.

An output voltage from the alternator 1 and an output voltage from the battery B through the fuse F1 are supplied to an electric double layer capacitor C through a semiconductor relay Ry1 and a resistor R, thereby charging the electric double layer capacitor C. Between terminals of the semiconductor relay Ry1, a controller 3 is connected, and the controller 3 detects a potential difference between the terminals to turn ON/OFF the semiconductor relay Ry1 based on the detected potential difference. The resistor R prevents an overcurrent generated when the electric double layer capacitor C is charged.

As will be described later (FIG. 2), the electric double layer capacitor C includes six cells connected in series.

An output voltage from the electric double layer capacitor C is supplied to an electric power steering device (load) 4 through a fuse F2 and a semiconductor relay Ry2. Furthermore, the output voltage is supplied to the electric brake 5 through each of a fuse F7 and a semiconductor relay Ry3 (for the front wheel, for example), and through each of a fuse F8 and a semiconductor relay Ry4 (for the rear wheel, for example).

The output voltage from the battery B is also supplied to other loads through respective associated fuses. The semiconductor relays Ry1 to Ry4 are connected with a free wheel diode in an anti-parallel manner. The semiconductor relays Ry1 to Ry4 are turned ON/OFF in conjunction with an unillustrated ignition switch (ignition and starting switch).

Figure 2A:
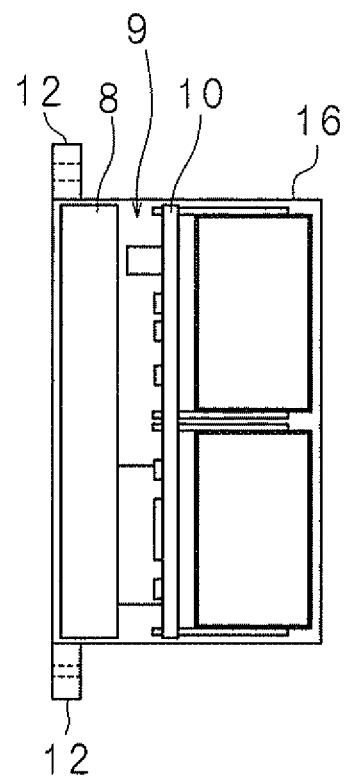
FIG. 2A is an explanatory diagram illustrating a cross section as viewed from a left lateral face of a state in which an electric double layer capacitor is contained in a junction box of the vehicle power supply apparatus according to the present invention.
Figure 2B:
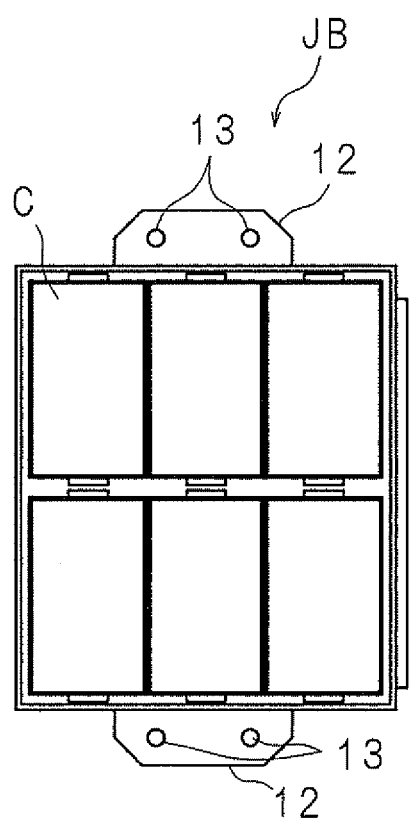
FIG. 2B is an explanatory diagram illustrating a cross section as viewed from a front face of the state in which the electric double layer capacitor is contained in the junction box of the vehicle power supply apparatus according to the present invention.
Figure 2C:
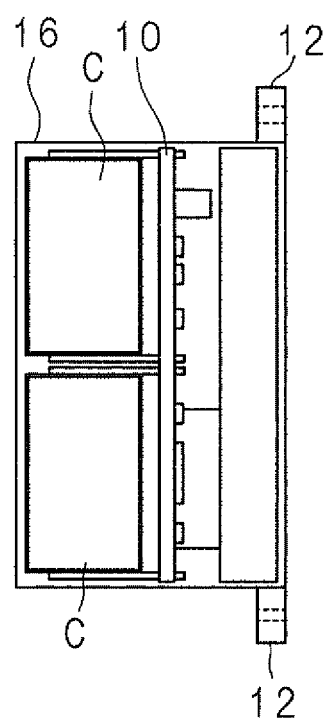
FIG. 2C is an explanatory diagram illustrating a cross section as viewed from a right lateral face of the state in which the electric double layer capacitor is contained in the junction box of the vehicle power supply apparatus according to the present invention.

FIG. 2A is an explanatory diagram illustrating a cross section as viewed from a left lateral face of a state in which the electric double layer capacitor C is contained in a junction box (electric connection box) JB of a vehicle, FIG. 2B is an explanatory diagram illustrating a cross section as viewed from a front face of this state, FIG. 2C is an explanatory diagram illustrating a cross section as viewed from a right lateral face of this state, and FIG. 2D is an explanatory diagram illustrating a cross section as viewed from a lower face of this state.

In this junction box JB, a casing 16 is formed into a rectangular parallelepiped shape, and is fastened to the vehicle with screws through two holes 13 provided at each of two collar portions 12 extended from a bottom face of the casing 16. An insulating plate and wiring (electric power system) 8 are contained inside of the casing 16 so as to cover the bottom face thereof, and a printed circuit board 10 is fitted into a position located slightly deeper than an intermediate position inside the casing 16, and is thus supported and fixed therein.

An electronic circuit 9, including the semiconductor relays Ry1 to Ry4, the fuses F1 to F6 and the controller 3, is provided at a back side of the printed circuit board 10, and the electric double layer capacitor C, in which the six cells are connected in series, is provided at a front side of the printed circuit board 10. A connector 11 passing through the right lateral face is connected to a lower right region of the back side of the printed circuit board 10 in front view.

In the vehicle power supply apparatus configured as described above, the controller 3 detects a potential difference between the terminals of the semiconductor relay Ry1, and turns ON the semiconductor relay Ry1 when the potential difference reaches 1.0 V, for example. When the charging of the electric double layer capacitor C proceeds and the potential difference reaches 0 V, for example, the semiconductor relay Ry1 is turned OFF. The controller 3 turns OFF the semiconductor relay Ry1 except when the electric double layer capacitor C is charged.

Upon activation of the electric power steering device 4 or the electric brake 5 and generation of a rush current in its motor when the unillustrated engine is rotated, the electric double layer capacitor C serves as a power supply in this case, and a resulting voltage drop is small because an internal resistance of the electric double layer capacitor C is very low.

Further, even if the semiconductor relay Ry1 is ON by chance at this time, the flow of an electric current from the electric double layer capacitor C is smoother than that of an electric current from the battery B, and therefore, a voltage drop caused by an internal resistance of the battery B is small.

The electric brake 5, serving as an important load, is fed power from two power supplies, i.e., the electric double layer capacitor C and the battery B; hence, even when a failure has occurred in either one of the power supplies, the electric brake 5 is fed power from the other power supply, thus realizing reliable supply of power.

(Embodiment 2)

Figure 3:
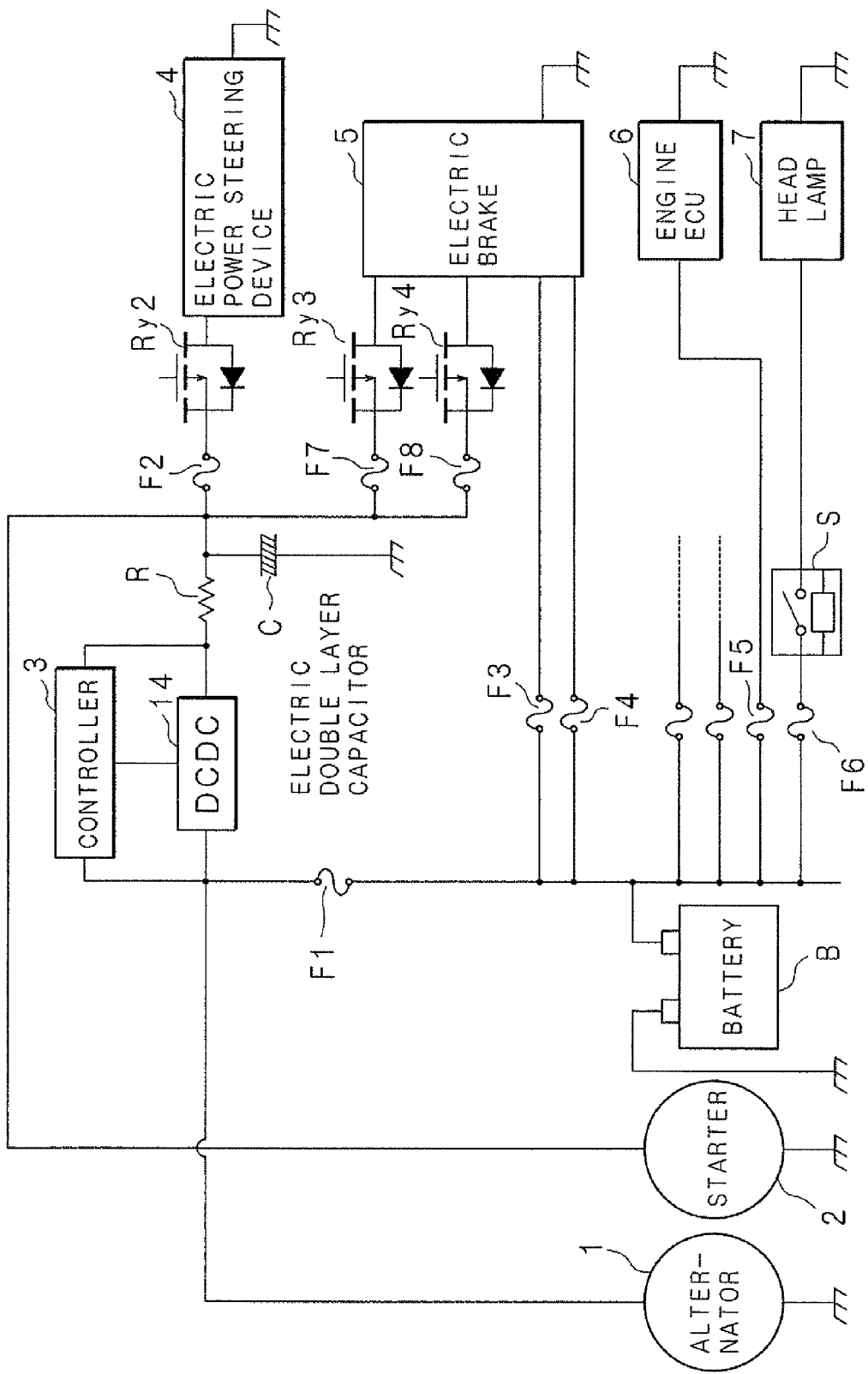
FIG. 3 is a block diagram illustrating a schematic configuration of an embodiment of a vehicle power supply apparatus according to the present invention.

FIG. 3 is a block diagram illustrating a schematic configuration of Embodiment 2 of a vehicle power supply apparatus according to the present invention.

In this vehicle power supply apparatus, power is not supplied from the battery B to the starter 2 but is supplied thereto from the electric double layer capacitor C. Further, instead of performing ON/OFF control on the semiconductor relay Ry1 based on a potential difference between the terminals of the semiconductor relay Ry1, the controller 3 detects a potential difference between terminals of a DC-DC converter 14 and performs ON/OFF control on the DC-DC converter 14 based on the detected potential difference. The DC-DC converter 14 increases a voltage from the battery B by +1.5 V (so that the resulting voltage reaches about 14 V), for example, and supplies the resulting voltage to the electric double layer capacitor C through the resistor R. Other than these features, the configuration of this vehicle power supply apparatus is similar to that of the vehicle power supply apparatus (FIGS. 1 and 2) described in Embodiment 1 mentioned above, and therefore, the description thereof will be omitted.

In the vehicle power supply apparatus configured as described above, the controller 3 detects a potential difference between the terminals of the DC-DC converter 14, and turns ON the DC-DC converter 14 when the potential difference reaches, for example, 1.0 V (input side>output side). When the charging of the electric double layer capacitor C proceeds due to the voltage increased by the DC-DC converter 14 and the potential difference reaches, for example, 1.5 V (input side<output side), the DC-DC converter 14 is turned OFF. The controller 3 turns OFF the DC-DC converter 14 except when the electric double layer capacitor C is charged.

Upon activation of the starter 2 and generation of a rush current in its motor when the engine is started, the electric double layer capacitor C serves as a power supply in this case, and a resulting voltage drop is small because the internal resistance of the electric double layer capacitor C is very low.

Further, even if the DC-DC converter 14 is ON by chance at this time, the flow of an electric current from the electric double layer capacitor C is smoother than that of an electric current from the battery B, and therefore, a voltage drop caused by the internal resistance of the battery B is small.

As a result, the frequency of occurrence of large current discharge of the battery B is reduced, and thus the lifetime of the battery B can be expected to increase. Other operations are similar to those of the vehicle power supply apparatus described in Embodiment 1 mentioned above, and therefore, the description thereof will be omitted.

(Embodiment 3)

Figure 4:
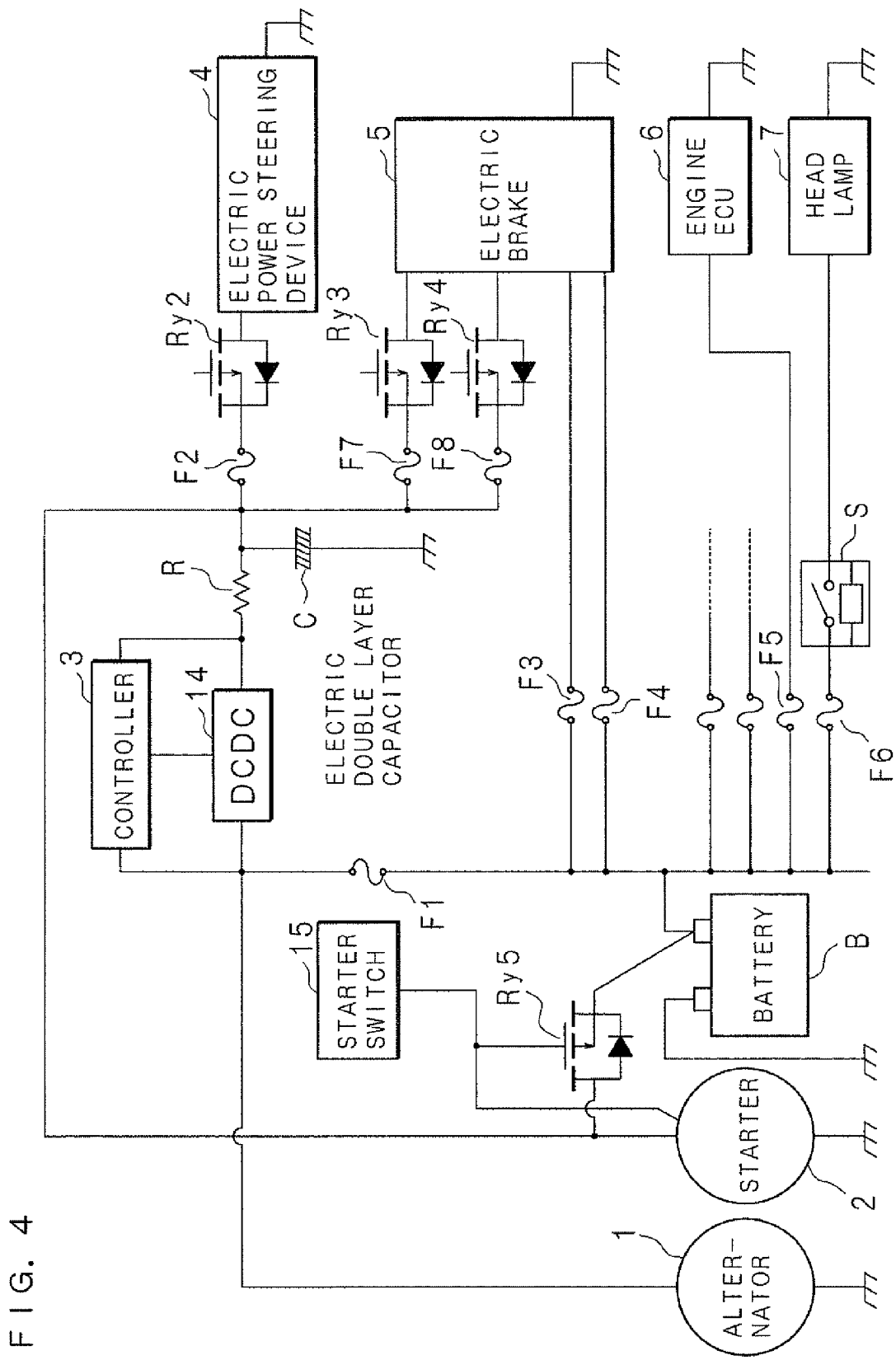
FIG. 4 is a block diagram illustrating a schematic configuration of an embodiment of a vehicle power supply apparatus according to the present invention.

FIG. 4 is a block diagram illustrating a schematic configuration of Embodiment 3 of a vehicle power supply apparatus according to the present invention.

In this vehicle power supply apparatus, power is supplied to the starter 2 from the electric double layer capacitor C; in addition, power is also supplied to the starter 2 from the battery B through a semiconductor relay Ry5. The semiconductor relay Ry5 is turned ON when a starter switch 15 is ON. Further, when the starter switch 15 is OFF, the semiconductor relay Ry5 is turned OFF to shut off power between the starter 2 and the battery B. Other than these features, the configuration of this vehicle power supply apparatus is similar to that of the vehicle power supply apparatus (FIG. 3) described in Embodiment 2 mentioned above, and therefore, the description thereof will be omitted.

In the vehicle power supply apparatus configured as described above, when the starter switch 15 is turned ON, the starter 2 is activated and a rush current is generated in its motor, the semiconductor relay Ry5 is also turned ON. Hence, power is supplied to the starter 2 from the electric double layer capacitor C and from the battery B; however, since the flow of an electric current from the electric double layer capacitor C is smoother than that of an electric current from the battery B, a voltage drop caused by the internal resistance of the battery B is small. Furthermore, the internal resistance of the electric double layer capacitor C is very small, and therefore, a voltage drop in the electric double layer capacitor C is also small.

Since power between the starter 2 and the battery B is shut off except when the engine is started, no influence is exerted on the output voltage from the electric double layer capacitor C even when, for example, the output voltage from the battery B is dropped due to a failure.

As a result, the amount of electric current at the time of large current discharge of the battery B is reduced, and thus the lifetime of the battery B can be expected to increase. Other operations are similar to those of the vehicle power supply apparatus described in Embodiment 2 mentioned above, and therefore, the description thereof will be omitted.

(Embodiment 4)

Figure 5:
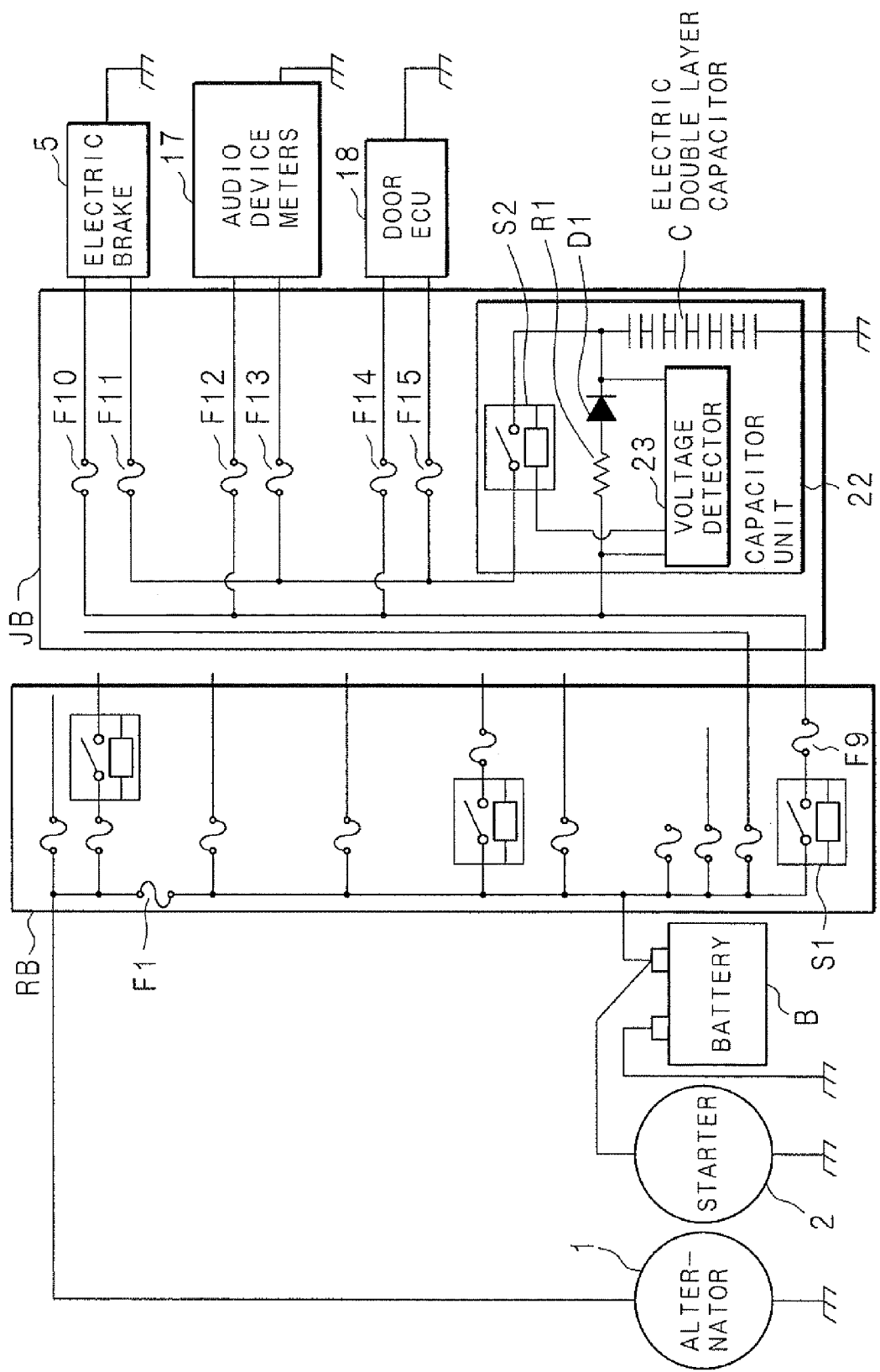
FIG. 5 is a block, diagram illustrating a schematic configuration of an embodiment of a vehicle power supply apparatus according to the present invention.

FIG. 5 is a block diagram illustrating a schematic configuration of Embodiment 4 of a vehicle power supply apparatus according to the present invention.

In this vehicle power supply apparatus, electric power generated by the alternator 1 is rectified in the alternator 1, and then the battery B is charged with the electric power through the fuse F1 inside a relay box RB.

An output voltage from the battery B is supplied to a capacitor unit 22 inside the junction box (electric connection box) JB through a switch S1 and a fuse F9 inside the relay box RB operated in conjunction with an unillustrated ignition switch (which also includes an accessory switch).

The output voltage from the battery B is supplied to the electric brake (load) 5 through the switch S1, the fuse F9 and a fuse F10 inside the junction box JB.

The output voltage from the battery B is also supplied to devices (loads) 17 placed in a dashboard, which include an audio device, meters and a navigation device, through the switch Si, the fuse F9 and a fuse F12 inside the junction box JB.

The output voltage from the battery B is further supplied to a door ECU (load) 18 through the switch S1, the fuse F9 and a fuse F14 inside the junction box JB.

Inside of the capacitor unit 22 is configured so that the electric double layer capacitor C is charged with the output voltage fed from the battery B through a resistor R1 and a backflow prevention diode (backflow prevention circuit) D1. A state in which the electric double layer capacitor C is contained in the junction box JB is illustrated in FIG. 2.

An output voltage from the electric double layer capacitor C is supplied to the electric brake (load) 5 through a switch S2 (second switch) inside the capacitor unit 22 and a fuse F11 inside the junction box JB.

The output voltage from the electric double layer capacitor C is also supplied to the devices (loads) 17 placed in the dashboard, which include the audio device, meters and navigation device, through the switch S2 inside the capacitor unit 22 and a fuse F13 inside the junction box JB.

The output voltage from the electric double layer capacitor C is further supplied to the door ECU (load) 18 through the switch S2 inside the capacitor unit 22 and a fuse F15 inside the junction box JB.

The capacitor unit 22 incorporates a voltage detector (voltage detecting means) 23. The voltage detector 23 detects the output voltage fed from the battery B, and connects/disconnects the switch S2 based on the detected voltage value.

The output voltage from the battery B is also supplied to other loads through relays and fuses inside the relay box RB or inside the junction box JB.

In the vehicle power supply apparatus configured as described above, the switch S1 is connected in conjunction with the ignition switch, and upon determination by the voltage detector 23 that the detected output voltage fed from the battery B is equal to or greater than a predetermined voltage, the switch S2 is disconnected. In this state, the output voltage from the battery B is supplied to the electric brake 5, the devices 17 placed in the dashboard, and the door ECU (load) 18. Moreover, the electric double layer capacitor C is charged with the output voltage from the battery B.

Upon drop in output voltage from the battery B and determination by the voltage detector 23 that the detected output voltage fed from the battery B is lower than the predetermined voltage, the switch S2 is connected. In this state, the output voltage from the electric double layer capacitor. C is supplied to the electric brake 5, the devices 17 placed in the dashboard, and the door ECU (load) 18.

Upon disconnection of the switch S1 in conjunction with the ignition switch, the electric double layer capacitor C is shut off from outside by the switch S2 that is turned OFF and the diode D1.

(Embodiment 5)

Figure 6:
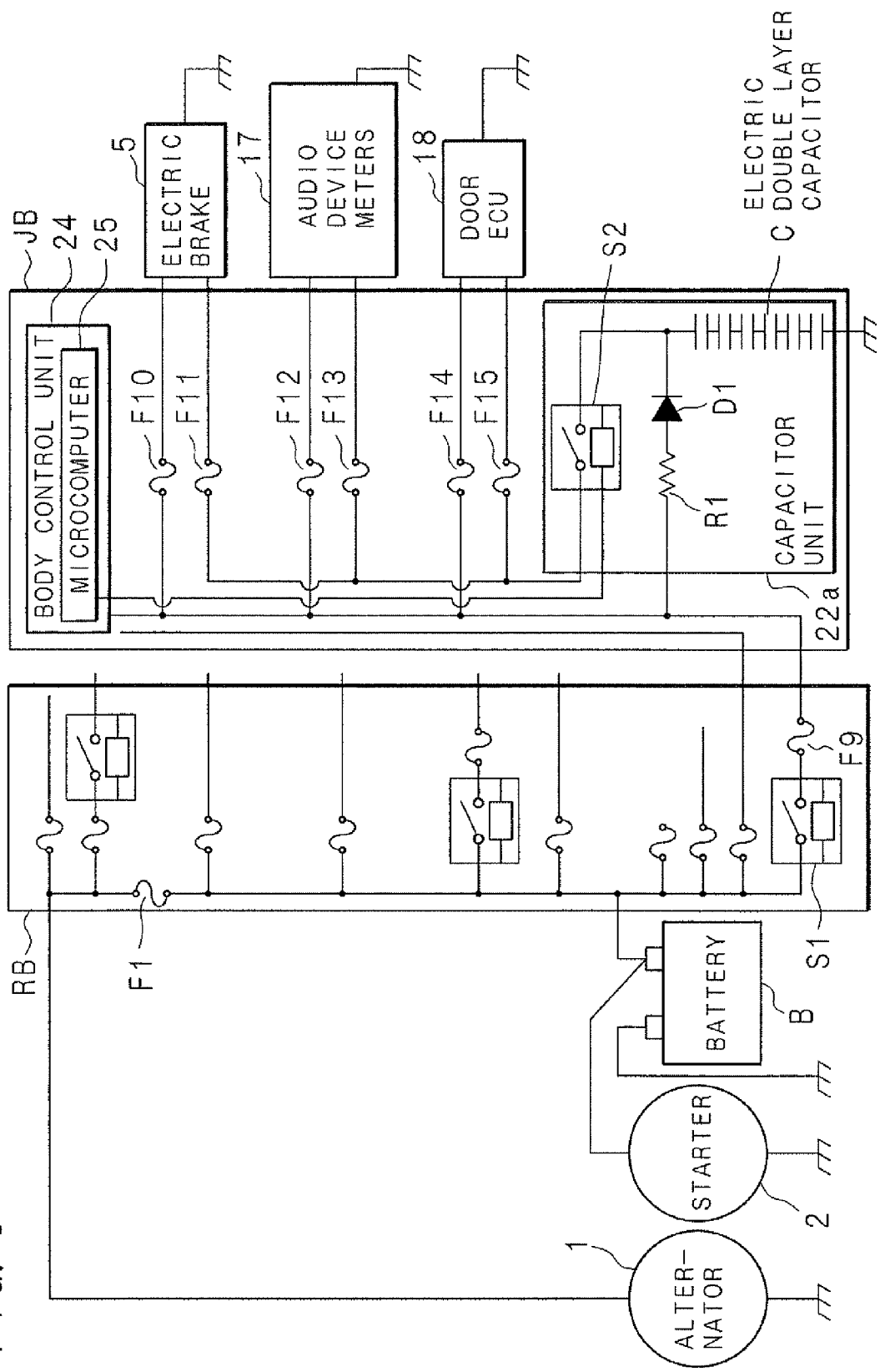
FIG. 6 is a block diagram illustrating a schematic configuration of an embodiment of a vehicle power supply apparatus according to the present invention.

FIG. 6 is a block diagram illustrating a schematic configuration of Embodiment 5 of a vehicle power supply apparatus according to the present invention.

In this vehicle power supply apparatus, the output voltage from the battery B is also supplied to a body control unit 24 inside the junction box JB through the switch S1 and the fuse F9. The body control unit 24 incorporates a microcomputer (voltage detecting means) 25, and the microcomputer 25 detects the output voltage, fed from the battery B, to connect/disconnect the switch S2 based on the detected voltage value. Accordingly, no voltage detector 23 illustrated in FIG. 5 exists in a capacitor unit 22a inside the junction box JB. Other than these features, the configuration of this vehicle power supply apparatus is similar to that of the vehicle power supply apparatus (FIG. 5) described in Embodiment 4 mentioned is above, and therefore, the description thereof will be omitted.

In the vehicle power supply apparatus configured as described above, the switch S1 is connected in conjunction with the ignition switch, and upon determination by the microcomputer 25 that the detected output voltage fed from the battery B is equal to or greater than a predetermined voltage, the switch S2 is disconnected. In this state, the output voltage from the battery B is supplied to the electric brake 5, the devices 17 placed in the dashboard, and the door ECU 18. Moreover, the electric double layer capacitor C is charged with the output voltage from the battery B.

Upon drop in output voltage from the battery B and determination by the microcomputer 25 that the detected output voltage from the battery B is lower than the predetermined voltage, the switch S2 is connected. In this state, the output voltage from the electric double layer capacitor C is supplied to the electric brake 5, the devices 17 placed in the dashboard, and the door ECU 18.

Upon disconnection of the switch S1 in conjunction with the ignition switch, the electric double layer capacitor C is shut off from outside by the switch S2 that is turned OFF and the diode D1.

(Embodiment 6)

Figure 7:
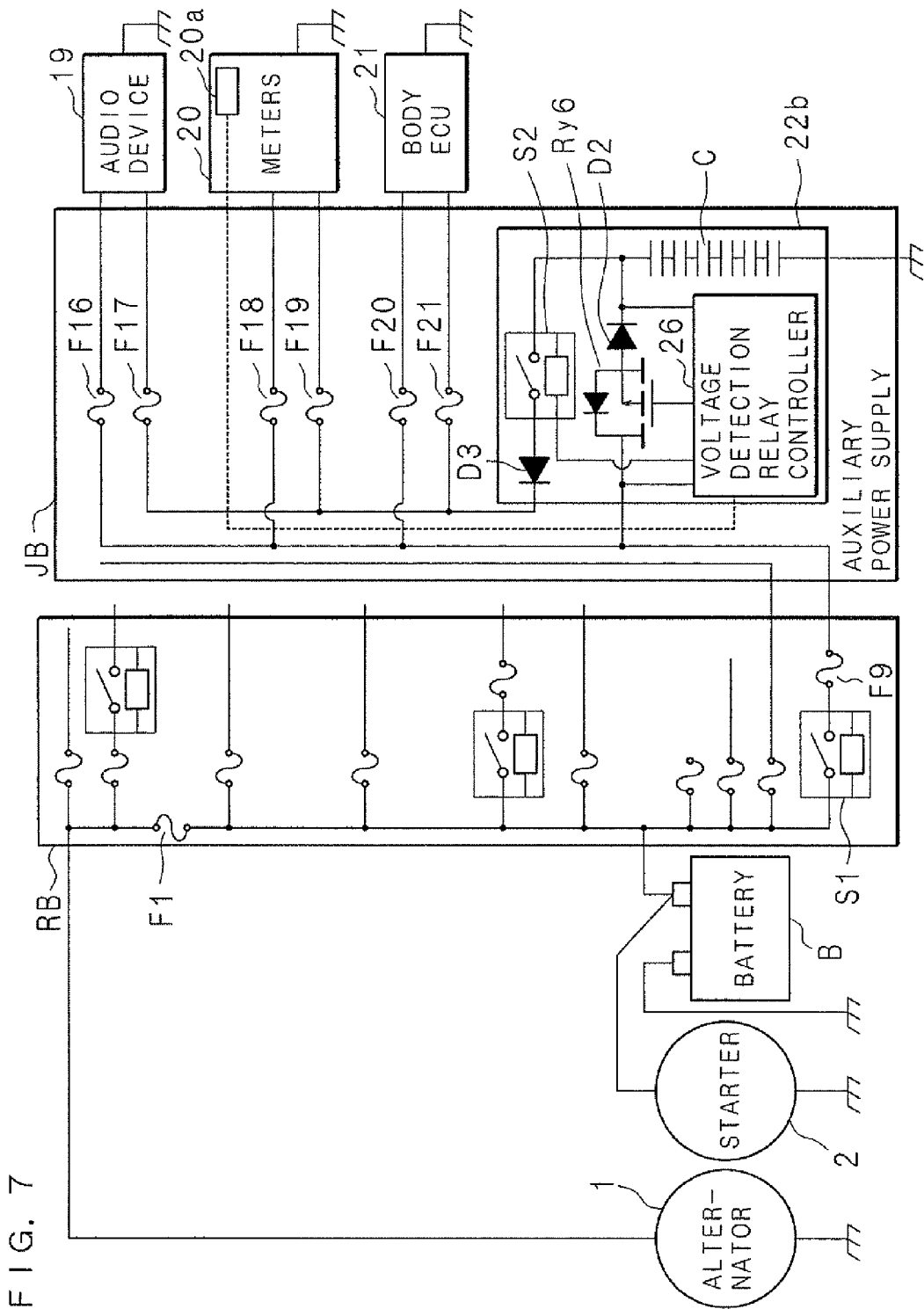
FIG. 7 is a block diagram illustrating a schematic configuration of an embodiment of a vehicle power supply apparatus according to the present invention.

FIG. 7 is a block diagram illustrating a schematic configuration of Embodiment 6 of a vehicle power supply apparatus according to the present invention.

In this vehicle power supply apparatus, electric power generated by the alternator 1 is rectified in the alternator 1, and then the battery B is charged with the electric power through the fuse F1 inside the relay box RB.

The output voltage from the battery B is supplied to a capacitor unit 22b inside the junction box (electric connection box) JB through the switch S1 and the fuse F9 inside the relay box RB operated in conjunction with the unillustrated ignition switch (which also includes an accessory switch).

The output voltage from the battery B is supplied to devices (loads) 19 placed in the dashboard, which include an audio device and a navigation device, through the switch S1, the fuse F9 and a fuse F16 inside the junction box JB.

The output voltage from the battery B is also supplied to meters (loads) 20 placed in the dashboard, through the switch S1, the fuse F9 and a fuse F18 inside the junction box JB.

The output voltage from the battery B is further supplied to a body ECU (load) 21 through the switch S1, the fuse F9 and a fuse F20 inside the junction box JB.

The output voltage from the electric double layer capacitor C is supplied to the devices 19 placed in the dashboard, through the switch (second switch) S2 inside the capacitor unit 22b, a backflow prevention diode D3 connected in a forward direction, and a fuse F17 inside the junction box JB.

The output voltage from the electric double layer capacitor C is also supplied to the meters 20 placed in the dashboard, through the switch S2, the diode D3 and a fuse F19 inside the junction box JB.

The output voltage from the electric double layer capacitor C is further supplied to the body ECU 21 through the switch S2, the diode D3 and a fuse F21 inside the junction box JB.

Figure 8:
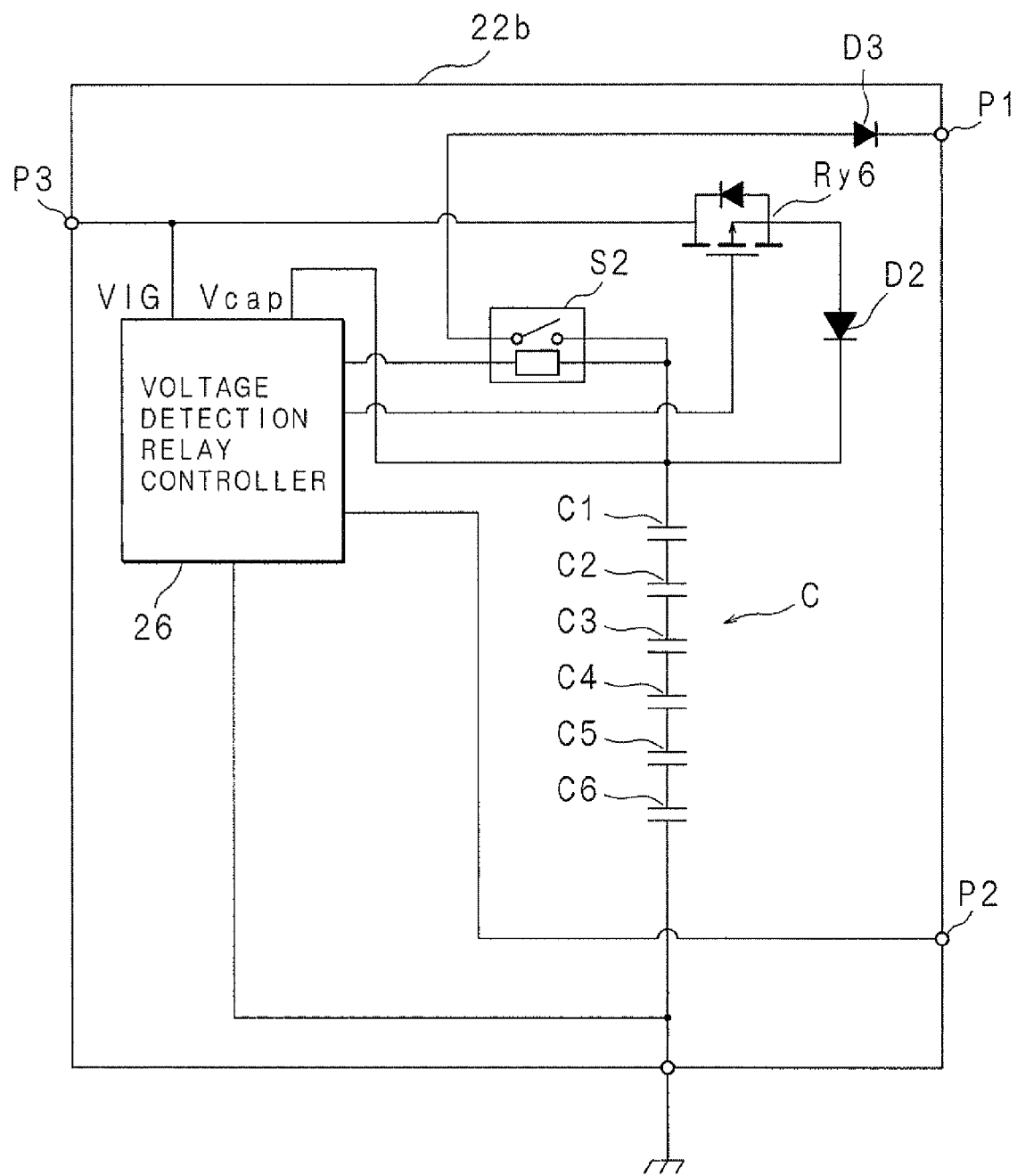
FIG. 8 is a block diagram illustrating a configuration example of a capacitor unit.

FIG. 8 is a block diagram illustrating a configuration example of the capacitor unit 22b.

Inside of the capacitor unit 22b is configured so that the electric double layer capacitor C is charged with the output voltage fed from the battery B through a semiconductor relay Ry6 and a backflow prevention diode D2. In the electric double layer capacitor C, six cells C1 to C6 are connected in series.

The output voltage from the electric double layer capacitor C is outputted from an output terminal P1 of the capacitor unit 22b through the switch S2 inside the capacitor unit 22b and the diode D3 connected in the forward direction. Further, an output voltage Vcap from the electric double layer capacitor C is fed to and detected by a voltage detection relay controller 26 inside the capacitor unit 22b.

The voltage detection relay controller 26 receives and detects an output voltage VIG fed from the battery B to an input terminal P3 of the capacitor unit 22b. The voltage detection relay controller 26 controls charging of the electric double layer capacitor C by the semiconductor relay Ry6 based on the detected output voltage VIG from the battery B.

The voltage detection relay controller 26 also controls discharge of the electric double layer capacitor C by the switch S2 based on the detected output voltage Vcap from the electric double layer capacitor C. Furthermore, a discharge signal indicating that the discharge of the electric double layer capacitor C falls within a predetermined voltage range is outputted from a signal terminal P2 of the capacitor unit 22b. The outputted discharge signal lights up an indicator lamp (indicator means) 20a included in the meters 20 placed in the dashboard (FIG. 7).

Figure 9:
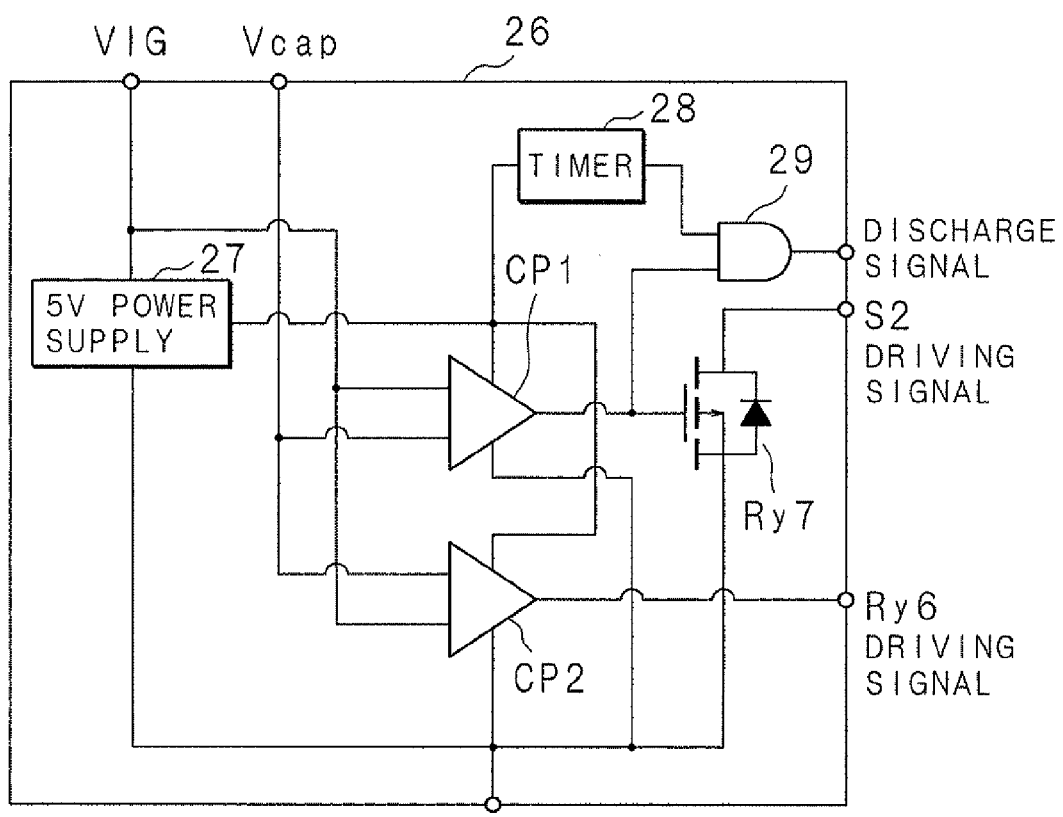
FIG. 9 is a block diagram. illustrating a configuration example of a voltage detection relay controller.

FIG. 9 is a block diagram illustrating a configuration example of the voltage detection relay controller 26.

In the voltage detection relay controller 26, the output voltage VIG received from the battery B is supplied to a 5 V power supply 27, one of input terminals of a comparator CP1, and the other input terminal of a comparator CP2. A voltage of 5 V outputted from the 5 V power supply 27 is used as driving power for the comparators CP1 and CP2 and a timer 28.

Upon measurement of a predetermined time (equal to or longer than a time required to charge the capacitor C) since the supply of driving power of 5 V (i.e., since the start of the engine), the timer 28 starts output of a positive signal to one of input terminals of an AND gate 29.

The output voltage Vcap from the electric double layer capacitor C is supplied to the other input terminal of the comparator CP1 and one of input terminals of the comparator CP2. An output terminal of the comparator (voltage detecting means or second voltage detecting means) CP1 is connected to a gate of a semiconductor relay Ry7. Further, the output terminal of the comparator CP1 is connected to the other input terminal of the AND gate 29. An output terminal of the AND gate 29 is connected to the signal terminal P2 of the capacitor unit 22b, and outputs the above-mentioned discharge signal therefrom.

A source of the semiconductor relay Ry7 is grounded, and a drain thereof is connected to one of terminals of a coil of the switch S2 (relay). The output voltage Vcap from the electric double layer capacitor C is supplied to the other terminal of the coil. Upon turning ON of the semiconductor relay Ry7, an electric current flows through the coil to turn ON the switch S2, and the output voltage Vcap from the electric double layer capacitor C is outputted from the output terminal P1 of the capacitor unit 22b through the diode D3.

An output terminal of the comparator CP2 is connected to a gate of the semiconductor relay Ry6.

In the vehicle power supply apparatus configured as described above, upon connection of the switch S1 in conjunction with the ignition switch, the 5 V power supply is activated, and the comparators CP1 and CP2 and the timer 28 are activated.

Upon determination by the comparator CP1 that the detected output voltage VIG from the battery B is higher than the output voltage Vcap from the electric double layer capacitor C, the semiconductor relay Ry7 is turned OFF to disconnect the switch S2.

Moreover, upon determination by the comparator CP2 that the detected output voltage VIG is higher than the detected output voltage Vcap, a positive signal is outputted to turn ON the semiconductor relay Ry6, and the electric double layer capacitor C is charged by the battery B.

In this state, the output voltage from the battery B is supplied to the devices 19 placed in the dashboard, the meters 20 and the body ECU 21.

Upon measurement of the predetermined time equal to or longer than the time required to charge the capacitor C after the activation, the timer 28 starts the output of a positive signal to the one input terminal of the AND gate 29.

When the output voltage from the battery B is dropped and a positive signal is outputted from the comparator CP1 upon determination that the output voltage VIG from the battery B is lower, the semiconductor relay Ry7 is turned ON to connect the switch S2. In this state, the output voltage Vcap from the electric double layer capacitor C is supplied to the devices 19 placed in the dashboard, the meters 20 and the body ECU 21.

Furthermore, in this case, the positive signal is also supplied to the other input terminal of the AND gate 29 to output a positive discharge signal, thereby lighting up the indicator lamp 20a (FIG. 7).

Besides, upon determination by the comparator CP2 that the output voltage VIG is lower, the semiconductor relay Ry6 is turned OFF.

Upon disconnection of the switch S1 in conjunction with the ignition switch, the 5 V power supply is turned OFF, and the comparators CP1 and CP2 and the timer 28 are turned OFF. As a result, the semiconductor relay Ry7, the switch S2 and the semiconductor relay Ry6 are turned OFF, the electric double layer capacitor C is shut off from outside, and the indicator lamp 20a is extinguished.

Note that in Embodiment 6, one of the requirements for lighting up of the indicator lamp 20a is that the output voltage VIG from the battery B must be relatively lower than the output voltage Vcap from the electric double layer capacitor C; however, an alternative requirement may be that the detected output voltage Vcap must be equal to or higher than a fixed voltage value such as 11.5 V or more, for example. It is to be noted that the requirements for discharge of the electric double layer capacitor C are not changed.

Figure 10:
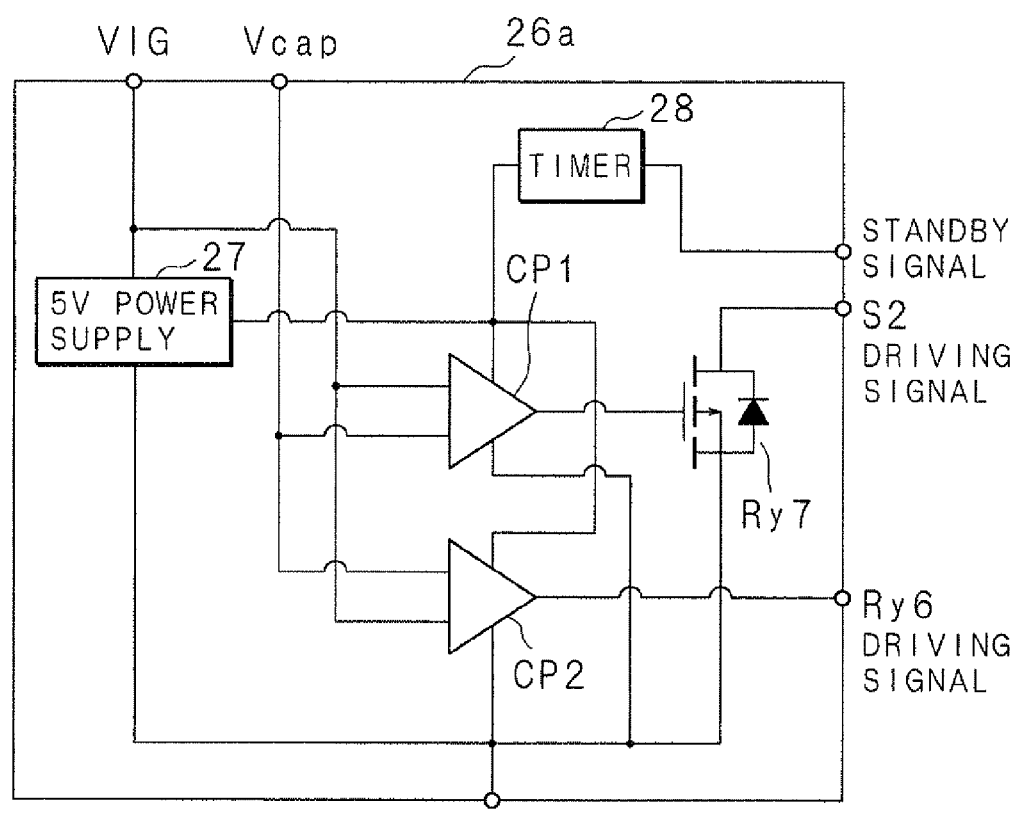
FIG. 10 is a block diagram illustrating another configuration example of a voltage detection relay controller.

Moreover, the AND gate 29 may be removed from the configuration of the voltage detection relay controller 26 (FIG. 9) to provide a voltage detection relay controller 26a such as one illustrated in FIG. 10, in which upon measurement of the predetermined time equal to or longer than the time required to charge the capacitor C after the activation, the timer 28 may light up the indicator lamp 20a. In that case, a discharge signal will serve as a standby signal indicating that discharge is allowed.

Figure 11:
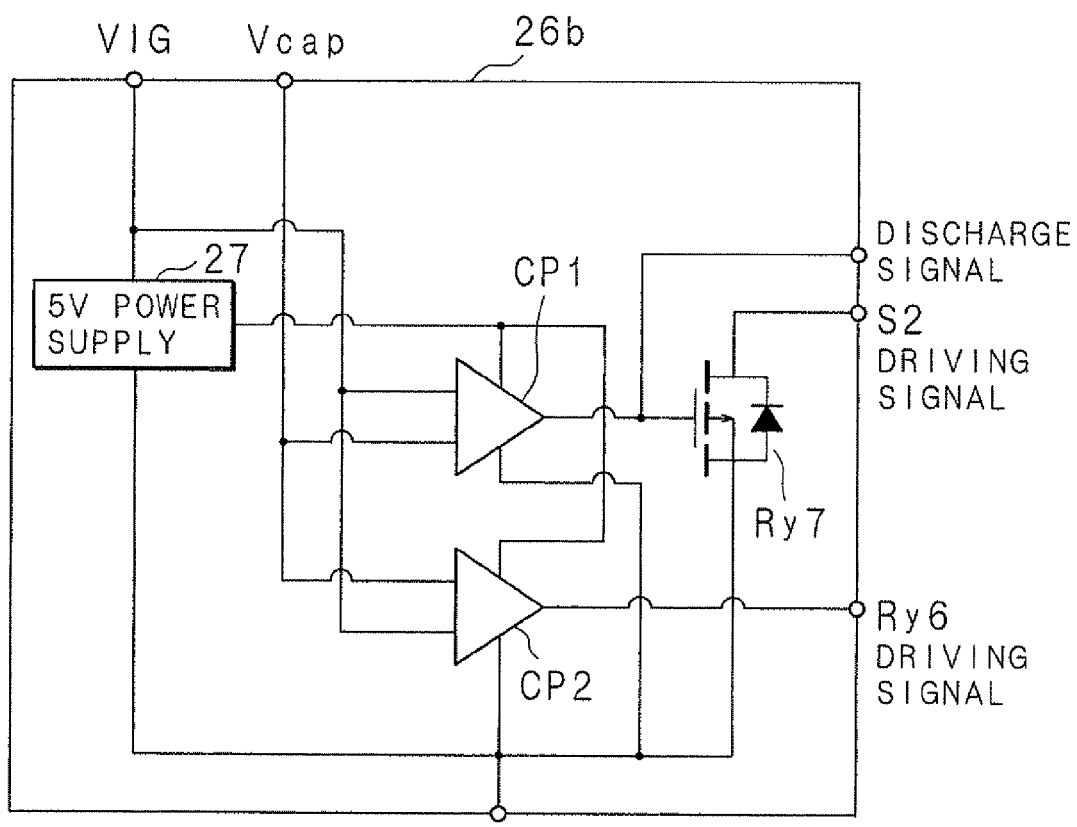
FIG. 11 is a block diagram illustrating still another configuration example of a voltage detection relay controller.

Besides, the timer 28 may be removed from the configuration of the voltage detection relay controller 26a (FIG. 10) to provide a voltage detection relay controller 26b such as one illustrated in FIG. 11, in which the indicator lamp 20a may be lit up when the semiconductor relay Ry7 is turned ON to connect the switch S2 and the discharge of the electric double layer capacitor C occurs.

The present invention is applicable to a power supply apparatus which includes a battery charged with electric power generated by a generator operated in conjunction with an engine and through which electric power discharged by the battery and electric power generated by the generator are supplied to a plurality of loads.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A vehicle power supply apparatus which comprises a battery charged with electric power generated by a generator operated in conjunction with an engine and through which electric power discharged by the battery and electric power generated by the generator are supplied to a plurality of loads, the vehicle power supply apparatus comprising:
   an electric double layer capacitor connected in parallel to the battery;
   a connection circuit configured to switch connection and disconnection between respective homopolar terminals of the battery and the electric double layer capacitor;
   a potential difference detecting section configured to detect a potential difference between terminals of the connection circuit;
   a time measuring section configured to measure a time elapsed since start of the engine;
   a capacitor voltage detecting section configured to detect an output voltage from the electric double layer capacitor;
   a capacitor voltage determining section configured to determine whether or not the output voltage detected by the capacitor voltage detecting section falls within a predetermined voltage range; and
   an indicating section configured to indicate a determination result upon determination by the capacitor voltage determining section that the detecting output voltage falls within the predetermined voltage range after measurement of a predetermined time by the time measuring section,
   wherein the connection circuit is connected to charge the electric double layer capacitor based on the potential difference detected by the potential difference detecting section, and
   wherein the loads comprise loads each of which generates a rush current of a predetermined value or more and each of which is fed electric power outputted by the electric double layer capacitor.

2. The vehicle power supply apparatus according to claim 1,
   wherein electric power is also directly supplied from the battery to some of the loads each of which generates the rush current.

3. The vehicle power supply apparatus according to claim 1,
   wherein the loads, each of which generates the rush current, comprise a starter of the engine.

4. The vehicle power supply apparatus according to claim 3, further comprising:
   a switch configured to switch connection and disconnection between the starter and the battery;
   wherein the switch is connected only when the starter is activated.

5. The vehicle power supply apparatus according to claim 1,
   wherein the electric double layer capacitor is contained in an electric connection box in which a branch circuit from the battery to the load and a fuse are contained.

6. A vehicle power supply apparatus which comprises a battery charged with electric power generated by a generator operated in conjunction with an engine and through which electric power discharged by the battery and electric power generated by the generator are supplied to a plurality of loads, the vehicle power supply apparatus comprising:
   an electric double layer capacitor connected to the battery through a backflow prevention circuit so as to be charged;
   a switch configured to switch connection and disconnection between the electric double layer capacitor and one or a plurality of the loads;
   a battery voltage detecting section configured to detect an output voltage from the battery;
   a battery voltage determining section configured to determine whether or not the voltage detected by the battery voltage detecting section is lower than a predetermined voltage;

a time measuring section configured to measure a time elapsed since start of the engine;

a capacitor voltage detecting section configured to detect an output voltage from the electric double layer capacitor;

a capacitor voltage determining section configured to determine whether or not the output voltage detected by the capacitor voltage detecting section falls within a predetermined voltage range; and an indicating section configured to indicate a determination result upon determination by the capacitor voltage determining section that the detected output voltage falls within the predetermined voltage range after measurement of a predetermined time by the time measuring section, wherein upon determination by the battery voltage determining section that the detected voltage is lower than the predetermined voltage, the switch is connected.

7. The vehicle power supply apparatus according to claim 6, wherein the switch is operated in conjunction with the indicating section.

8. The vehicle power supply apparatus according to claim 6, wherein the electric double layer capacitor is contained in an electric connection box in which a branch circuit from the battery to the load and a fuse are contained.

* * * * *